US008432788B2

(12) United States Patent
Abdulla et al.

(10) Patent No.: US 8,432,788 B2
(45) Date of Patent: Apr. 30, 2013

(54) INTELLIGENT FAILBACK IN A LOAD-BALANCED NETWORKING ENVIRONMENT

(75) Inventors: Ayaz Abdulla, Sunnyvale, CA (US); Norman K. Chen, Sunnyvale, CA (US); Anand Rajagopalan, Saratoga, CA (US); Ashutosh K. Jha, Sunnyvale, CA (US); Hemamalini Manickavasagam, San Jose, CA (US); Sameer Nanda, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 214 days.

(21) Appl. No.: 11/750,914

(22) Filed: May 18, 2007

(65) Prior Publication Data

US 2008/0285435 A1    Nov. 20, 2008

(51) Int. Cl.
*G01R 31/08* (2006.01)
*G06F 11/00* (2006.01)
*G08C 15/00* (2006.01)

(52) U.S. Cl.
USPC ........................................................ 370/217

(58) Field of Classification Search ............ 370/216, 370/217, 242, 244, 235
See application file for complete search history.

(56) References Cited

U.S. PATENT DOCUMENTS

| 5,508,997 A | 4/1996 | Katou |
| 5,557,798 A * | 9/1996 | Skeen et al. .................. 705/35 |
| 5,600,638 A | 2/1997 | Bertin et al. |
| 5,724,510 A | 3/1998 | Arndt et al. |
| 5,864,535 A | 1/1999 | Basilico |
| 5,914,938 A | 6/1999 | Brady et al. |
| 6,052,733 A * | 4/2000 | Mahalingam et al. ........ 709/235 |
| 6,151,297 A | 11/2000 | Congdon et al. |
| 6,208,616 B1 * | 3/2001 | Mahalingam et al. ........ 370/216 |
| 6,253,334 B1 * | 6/2001 | Amdahl et al. .............. 714/4.12 |
| 6,512,774 B1 * | 1/2003 | Vepa et al. .................... 370/401 |

(Continued)

FOREIGN PATENT DOCUMENTS

| JP | 11-027320 | 1/1999 |
| JP | 2000-029806 | 1/2000 |

(Continued)

OTHER PUBLICATIONS

Office Action. U.S. Appl. No. 11/750,919. Dated Jun. 12, 2009.

(Continued)

*Primary Examiner* — Mark Rinehart
*Assistant Examiner* — Maharishi Khirodhar
(74) *Attorney, Agent, or Firm* — Patterson & Sheridan, LLP

(57) ABSTRACT

One embodiment of the present invention sets forth a method for failing back network connections to a network interface card (NIC) within a computing device. The method includes the steps of monitoring a failed or unreliable NIC within the computing device, determining that the failed or unreliable NIC has recovered, determining that a functional NIC within the computing device is overloaded, selecting a first connection set communicating through the overloaded NIC, and transferring the first connection set to the recovered NIC. With this approach, intelligent decisions can be advantageously made regarding whether to fail back a network connection set to a recovered NIC based on the traffic loads on the overloaded NIC and the recovered NIC. Such an approach to balancing network traffic across the functional NICs within a computing device may substantially improve overall performance relative to prior art techniques.

12 Claims, 6 Drawing Sheets

U.S. PATENT DOCUMENTS

| | | |
|---|---|---|
| 6,560,630 B1 | 5/2003 | Vepa et al. |
| 6,567,377 B1 | 5/2003 | Vepa et al. |
| 6,570,875 B1 | 5/2003 | Hegde |
| 6,590,861 B1 | 7/2003 | Vepa et al. |
| 6,683,882 B1 | 1/2004 | Maufer et al. |
| 6,687,758 B2 * | 2/2004 | Craft et al. ............... 709/250 |
| 6,779,039 B1 | 8/2004 | Bommareddy et al. |
| 6,938,092 B2 | 8/2005 | Burns |
| 7,116,664 B2 | 10/2006 | Davis et al. |
| 7,159,034 B1 | 1/2007 | Rai |
| 7,299,294 B1 | 11/2007 | Bruck et al. |
| 7,324,512 B2 | 1/2008 | Larson et al. |
| 7,386,611 B2 | 6/2008 | Dias et al. |
| 7,415,028 B1 | 8/2008 | Allam |
| 7,460,470 B2 | 12/2008 | McGee et al. |
| 2001/0056503 A1 | 12/2001 | Hibbard |
| 2003/0167346 A1 | 9/2003 | Craft et al. |
| 2003/0229809 A1 | 12/2003 | Wexler et al. |
| 2004/0010619 A1 | 1/2004 | Thomas |
| 2005/0281190 A1 * | 12/2005 | McGee et al. ............ 370/216 |
| 2006/0010238 A1 * | 1/2006 | Craft et al. ............... 709/227 |
| 2006/0083227 A1 | 4/2006 | Eldar |
| 2006/0171303 A1 * | 8/2006 | Kashyap ................. 370/228 |
| 2006/0206611 A1 | 9/2006 | Nakamura |
| 2006/0212435 A1 * | 9/2006 | Williams et al. ............. 707/3 |
| 2006/0212453 A1 * | 9/2006 | Eshel et al. ............... 707/10 |
| 2006/0242153 A1 | 10/2006 | Newberry et al. |
| 2007/0002738 A1 | 1/2007 | McGee |
| 2007/0025253 A1 | 2/2007 | Enstone et al. |
| 2007/0201490 A1 | 8/2007 | Mahamuni |
| 2008/0022148 A1 | 1/2008 | Barnea et al. |
| 2008/0025226 A1 * | 1/2008 | Mogul et al. ............. 370/242 |
| 2008/0056246 A1 | 3/2008 | McGEE et al. |
| 2009/0222558 A1 * | 9/2009 | Xu et al. ................. 709/224 |
| 2010/0008251 A1 | 1/2010 | Bender et al. |

FOREIGN PATENT DOCUMENTS

| | | |
|---|---|---|
| JP | 2000-187632 | 7/2000 |
| JP | 2002-44178 | 2/2002 |
| JP | 2006518887 | 8/2006 |
| JP | 2006-253900 | 9/2006 |
| JP | 2008-295043 | 12/2008 |

OTHER PUBLICATIONS

Office Action. U.S. Appl. No. 11/305,177. Dated Aug. 6, 2009.
Office Action. U.S. Appl. No. 11/750,980. Dated Jul. 2, 2009.
Office Action. U.S. Appl. No. 11/750,984. Dated Jun. 24, 2009.
Office Action. U.S. Appl. No. 11/750,987. Dated Jun. 17, 2009.
Office Action. U.S. Appl. No. 11/750,903. Dated Jun. 22, 2009.
Final OA, U.S. Appl. No. 11/750,919 dtd Dec. 24, 2009.
Final Office Action. U.S. Appl. No. 11/305,177 dtd. Mar. 2, 2010.
Office Action, U.S. Appl. No. 11/705,987 dated Jun. 22, 2010.
English translation of JP 2000-029806 (provided as explanation of relevance).
English translation of JP 2000-187632 (provided as explanation of relevance).
English translation of JP 11-027320 (provided as explanation of relevance).
English translation of JP 2008-295043 (provided as explanation of relevance).
English translation of JP 2002-44178 (provided as explanation of relevance).
English translation of JP 2006-253900 (provided as explanation of relevance).
Masatoshi, Inuzuka. "Now see! Layer 4-7 Switch," Network World Japan, Jun. 2006, pp. 71-76.
English abstract of: Masatosh, "Now see! Layer 4-7 Switch," Network World Japan, Jun. 2006, provided as explanation of relevance.
Office Action, U.S. Appl. No. 11/305,177, dated Jun. 3, 2010.
KIPO Office Action for S/N 10-2008-46324, dated Nov. 18, 2010.
Office Action, U.S. Appl. No. 11/750,987, dated Oct. 19, 2011.
JP Office Action, Application No. 2008-130978 dated Jun. 1, 2011.

* cited by examiner

INTELLIGENT FAILBACK IN A LOAD-BALANCED NETWORKING ENVIRONMENT

BACKGROUND OF THE INVENTION

1. Field of the Invention

Embodiments of the present invention relate generally to network communications and more specifically to a system and method for intelligently failing back network connections in a load-balanced networking environment.

2. Description of the Related Art

Performance and reliability are key requirements for modern computer networks. When a network interface card ("NIC") fails or becomes unreliable and then returns to a fully functional state, the computing device may realize improved network performance by redistributing network connections to the now-functional NIC. More specifically, if a particular NIC in the computing device is or becomes overloaded, network performance may be improved by redistributing network connections between functional NICs in the computing device, including the recovered NIC. However, the overhead related to transferring connections from one NIC to another NIC may exceed the performance benefits of redistributing traffic among the functional NICs within the computing device. In such cases, overall networking performance may be reduced by attempting to redistribute the network connections. Additionally, the transferred connections may overload an efficiently operating NIC, thereby reducing the performance and reliability of that NIC.

As the foregoing illustrates, what is needed in the art is a technique for transferring network connections to one or more functional NICs in a computing device when failing back network connections that reduces the likelihood of NIC overloading or other phenomena that can impair overall system performance.

SUMMARY OF THE INVENTION

One embodiment of the present invention sets forth a method for failing back network connections to a network interface card (NIC) within a computing device. The method includes the steps of monitoring a failed or unreliable NIC within the computing device, determining that the failed or unreliable NIC has recovered, determining that a functional NIC within the computing device is overloaded, selecting a first connection set communicating through the overloaded NIC, and transferring the first connection set to the recovered NIC.

One advantage of the disclosed method is that, by rehashing connection sets on an overloaded NIC, intelligent decisions can be made regarding whether to fail back a network connection set to a recovered NIC based on the traffic loads on the overloaded NIC and the recovered NIC. Such an approach to balancing network traffic across the functional NICs within a computing device may substantially improve overall performance relative to prior art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Intelligent failback of network connections from an overloaded NIC to one or more fully functional NICs may be accomplished by using a hash engine that tracks network statistics, including the number of connections and amount of transmitted and received traffic through each NIC, and a TCP/IP stack that tracks the NIC through which each network connection initially communicates. Once a failed or unreliable NIC recovers to once again operate fully functionally, if another NIC within the system becomes overloaded, some network connections on the overloaded NIC are automatically failed back to the recovered NIC until the previously overloaded NIC is no longer overloaded. Such a transfer allows one or more additional network connections to be handled by an alternative NIC without exceeding the capacity of that NIC, thereby avoiding a connection redistribution paradigm that may reduce the overall performance of the computing device. Transferring the connections from the overloaded NIC may also include unoffloading the connections from the hardware offload engine within the overloaded NIC and subsequently offloading those connections to the hardware offload engine(s) within the recovered NIC to which those connections are transferred.

Figure 1A:
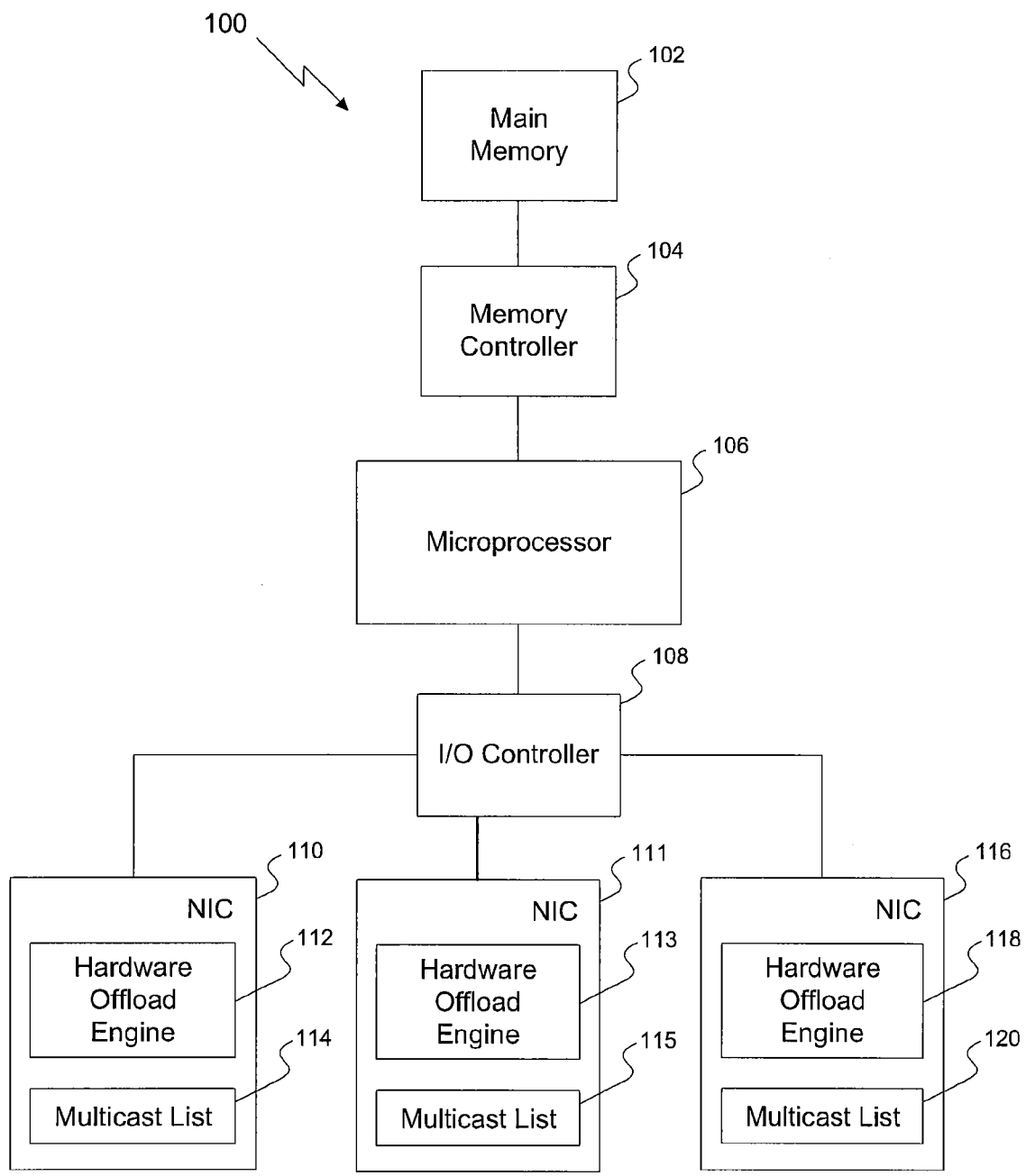
FIGS. 1A-1C illustrate a computing device in which one or more aspects of the present invention can be implemented.
Figure 1B:
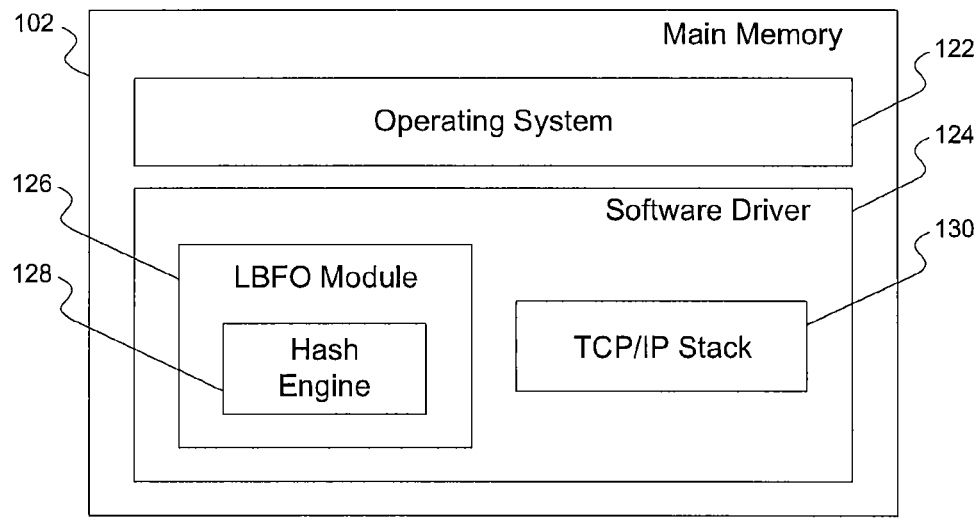
Figure 1C:
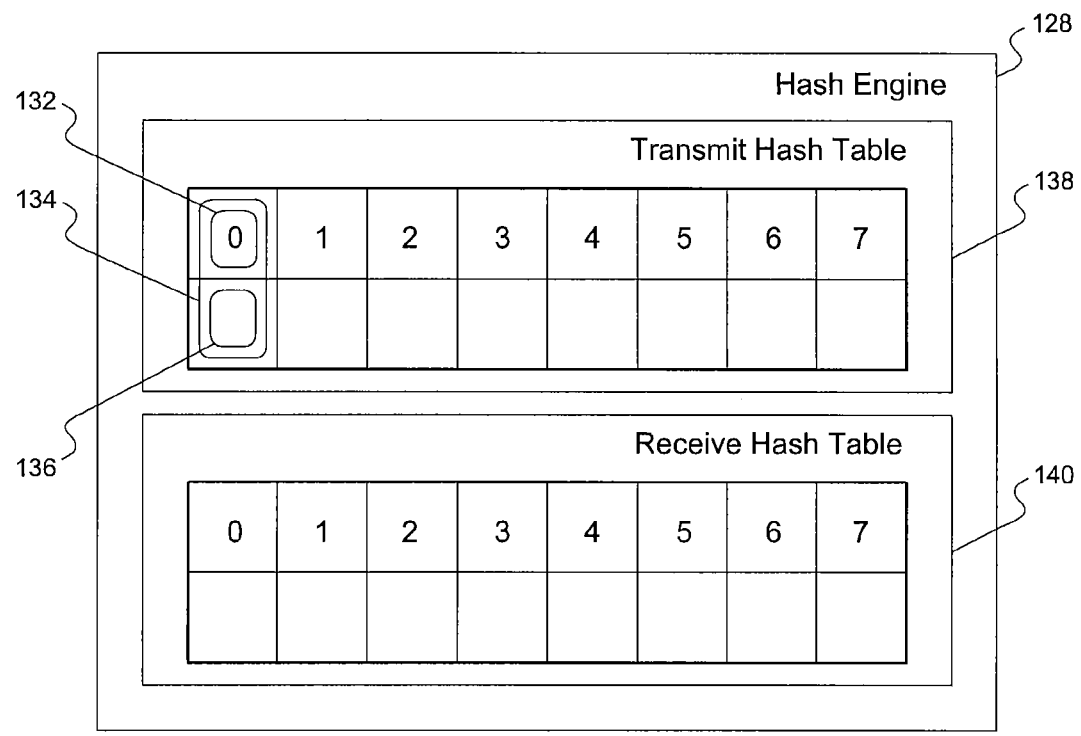
Figure 2A:
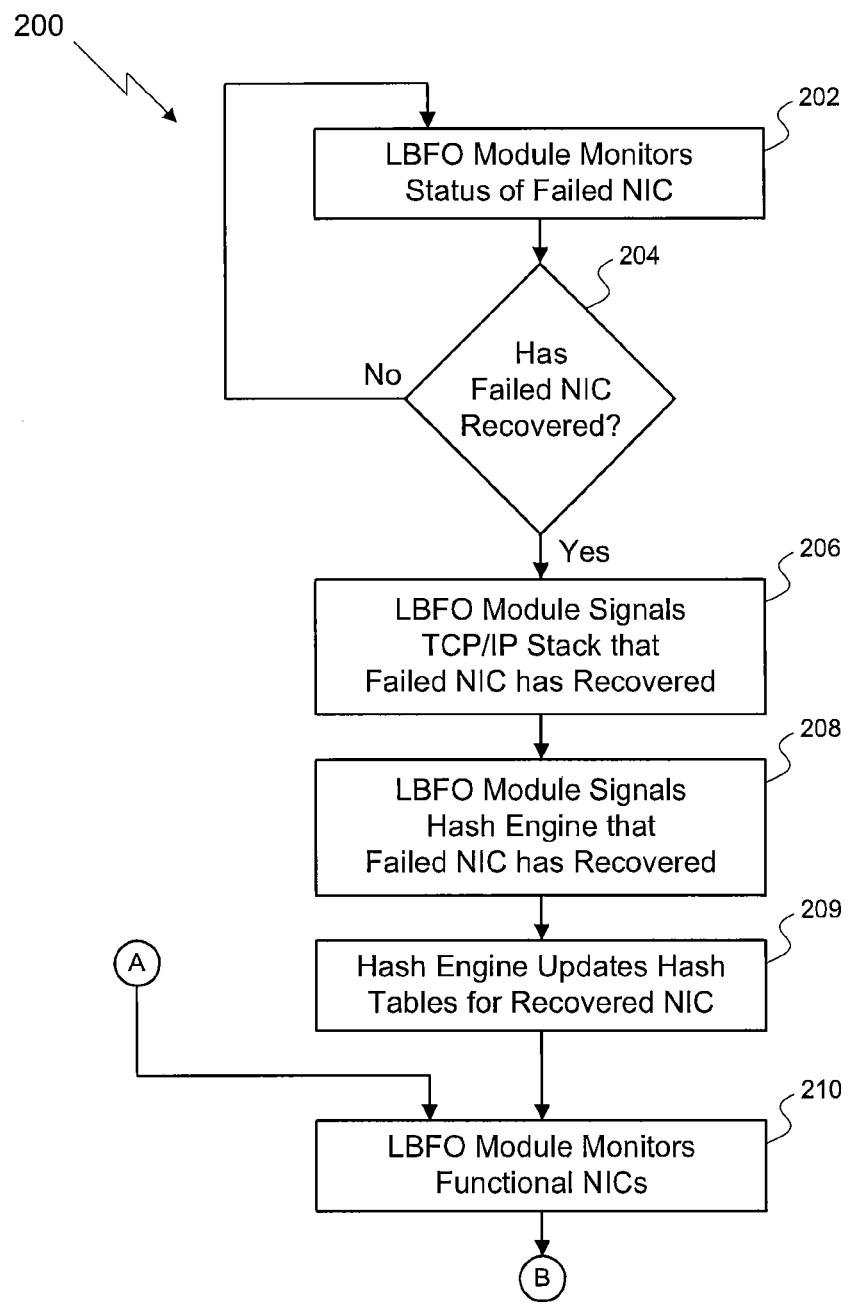
FIGS. 2A-2D illustrate a flowchart of method steps for failing back network connections from an overloaded NIC to one or more functional NICs in a computing device, according to one embodiment of the invention.
Figure 2B:
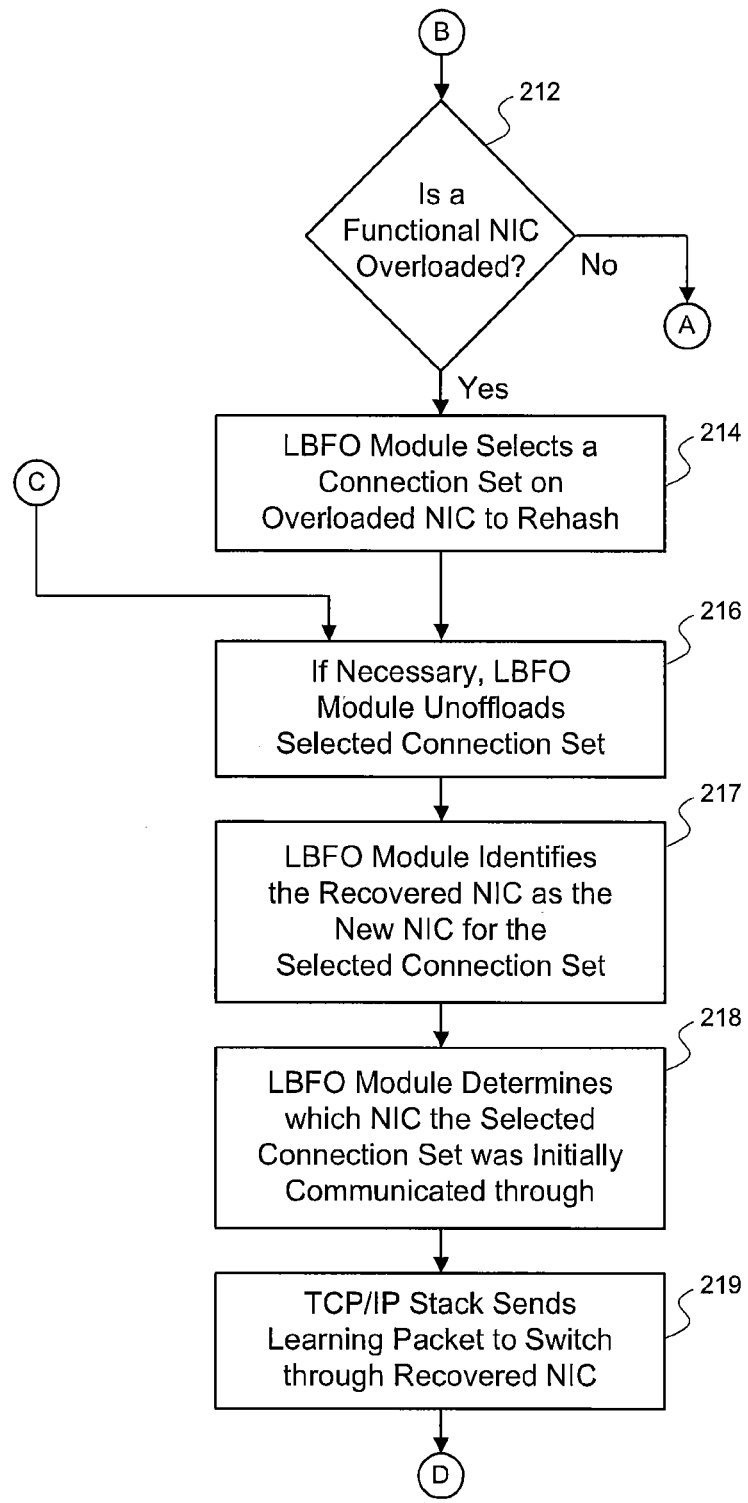
Figure 2C:
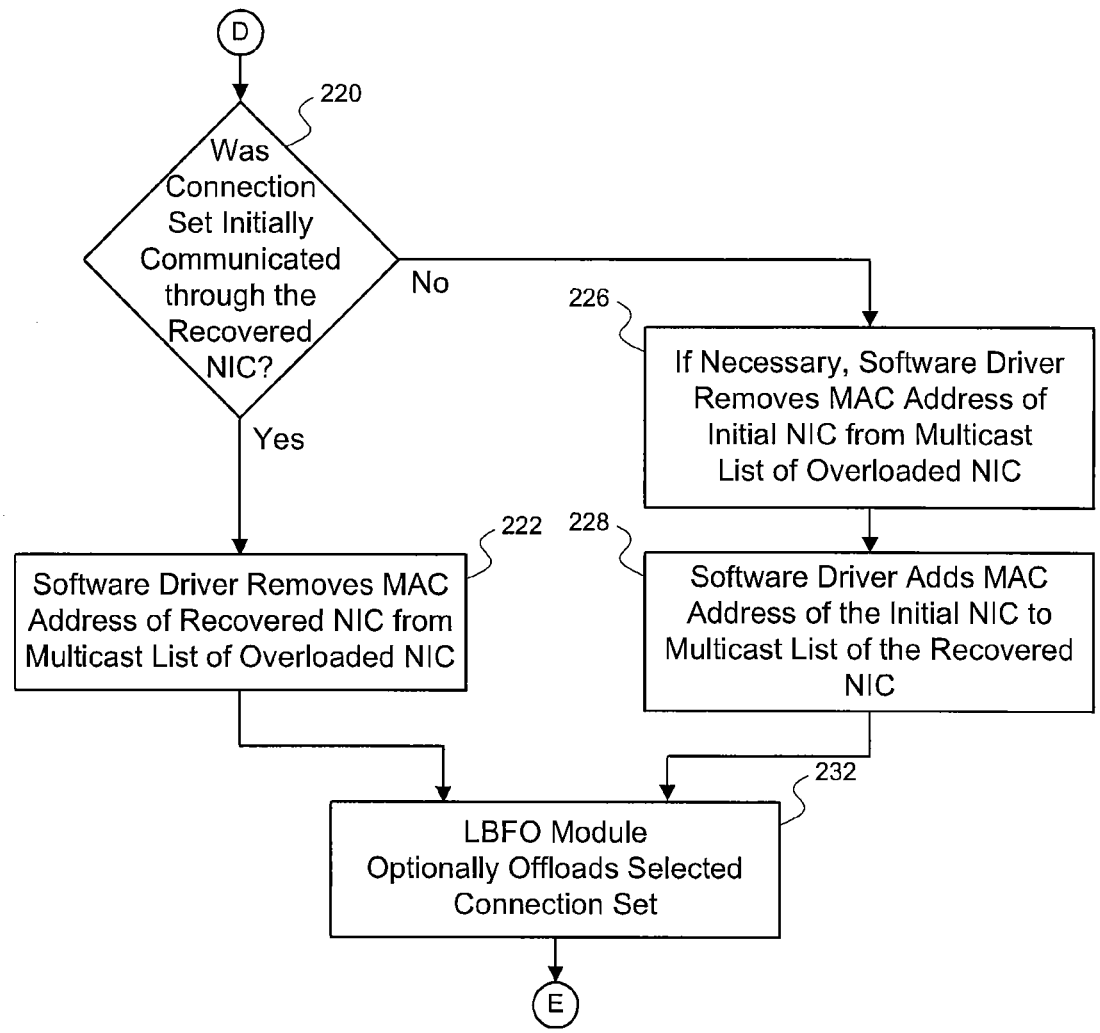
Figure 2D:
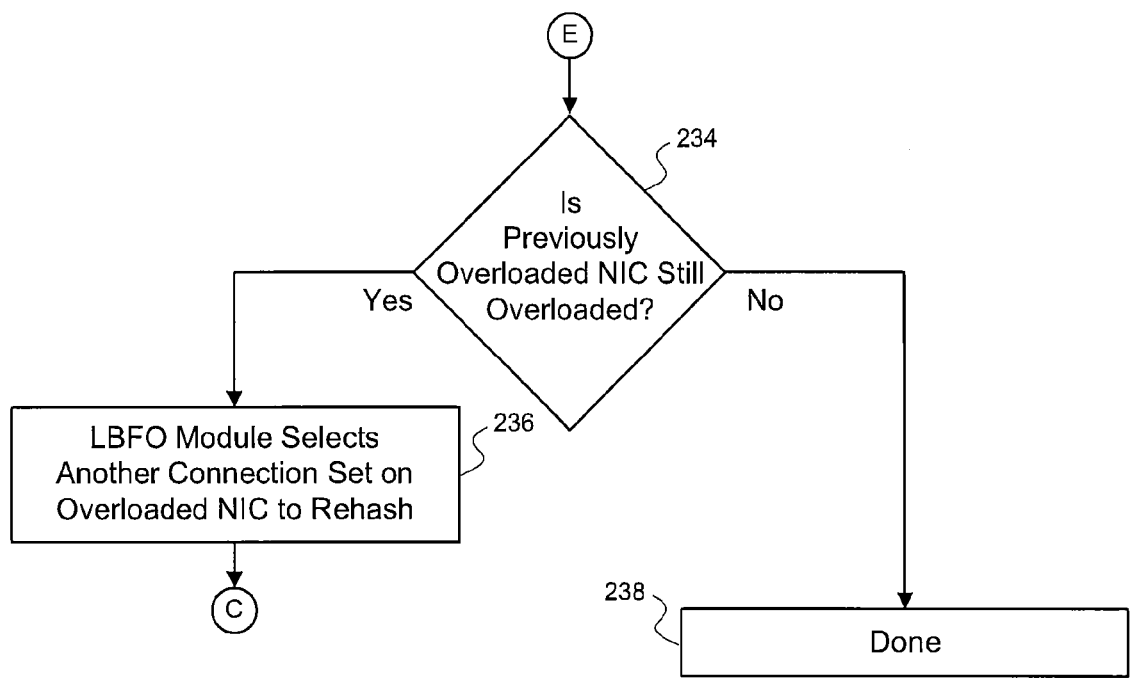

FIGS. 1A-1C illustrate a computing device 100 in which one or more aspects of the present invention can be implemented. As shown, the computing device 100 includes a main memory 102, a memory controller 104, a microprocessor 106, an I/O controller 108, and NICs 110, 111 and 116. NIC 110 includes a multicast list 114 and a hardware offload engine ("HOE") 112. NIC 111 includes a multicast list 115 and a HOE 113. NIC 116 includes a multicast list 120 and an HOE 118. HOEs 112, 113 and 118 include logic configured for processing network frames associated with network connections between the computing device 100 and one or more remote network computing devices (not shown) that have been selectively offloaded to NICs 110, 111 and 116. By processing network frames with HOEs 112, 113 and 118 (sometimes referred to as "handling connections in hardware") rather than performing those processing functions in a host software TCP/IP stack (sometimes referred to as "handling connections in software"), as is conventionally done, communications between the NICs 110, 111 and 116 and the microprocessor 106 as well as computations performed by the microprocessor 106 may be substantially reduced.

The memory controller 104 is coupled to the main memory 102 and to the microprocessor 106, and the I/O controller 108 is coupled to the microprocessor 106 and the NICs 110, 111 and 116. In one embodiment of the invention, the microprocessor 106 transmits commands or data to the NICs 110, 111 and 116 by writing commands or data into the I/O controller 108. Once such commands or data are written into the I/O controller 108, the I/O controller 108 optionally translates the commands or data into a format that the target NIC may understand and communicates the commands or data to the target NIC. Similarly, NICs 110, 111 and 116 transmit commands or data to the microprocessor 106 by writing commands or data into the I/O controller 108, and the I/O controller 108 optionally translates the commands or data into a format that the microprocessor 106 may understand and communicates the commands or data to the microprocessor 106. The aforementioned couplings may be implemented as memory busses or I/O busses, such as PCI™ busses, or any combination thereof, or may otherwise be implemented in any other technical feasible manner.

As shown in more detail in FIG. 1B, the main memory 102 includes an operating system 122 and a software driver 124. The software driver 124 includes a Load Balancing and Failover ("LBFO") module 126 and a TCP/IP stack 130. LBFO module 126 tracks networking statistics for each NIC (e.g., the number of connections on each NIC, the number of packets sent and received by each NIC) and communicates with the TCP/IP stack 130 when network connections are being moved from one NIC to another NIC within the computing device 100. The LBFO module 126 includes a hash engine 128, which intelligently determines how network connections should be distributed across the different functional NICs in the computing device 100, based on the aforementioned networking statistics. More details regarding the functionality of hash engine 128 are described in the related U.S. patent application titled, "Intelligent Load Balancing and Failover of Network Traffic," filed on May 18, 2007 and having Ser. No. 11/750,919. This related patent application is hereby incorporated herein by reference.

As shown in more detail in FIG. 1C, the hash engine 128 includes a transmit hash table 138 and a receive hash table 140. The purpose of the transmit hash table 138 is to select a functional NIC within the computing device 100 for transmitting packets related to a network connection, based on data provided to the transmit hash table 138 by the LBFO module 126. The transmit hash table 138 includes a plurality of hash table entries (e.g., hash table entry 134) and a software hash function (not shown). Additionally, each hash table entry includes a table index (e.g., table index 132) and a table value (e.g., table value 136). The LBFO module 126 directs the hash engine 128 to select a transmit NIC within the computing device 100 by communicating TCP/IP connection data to the hash engine 128, which communicates the TCP/IP connection data to the software hash function in the transmit hash table 138. In response, the software hash function selects a table index within the transmit hash table 138, based on the values of the TCP/IP connection data. From this selected table index, the transmit hash table 138 identifies the corresponding table value, and the hash engine 128 communicates the identified table value back to the LBFO module 126. Since the design and operation of software hash functions is well known to those skilled in the art, these issues will not be discussed herein. In one embodiment, the LBFO module 126 communicates the following four TCP/IP data to the hash engine 128: the client internet protocol ("IP") address, the server IP address, the server TCP port, the client TCP port, and the virtual local area network ("VLAN") connection ID. In other embodiments, the LBFO module 126 may communicate any technically feasible TCP/IP parameters to the hash engine 128.

The purpose of the receive hash table 140 is to select a functional NIC within the computing device 100 for receiving packets related to a network connection, based on the data provided to the receive hash table 140 by the LBFO module 126. Similar to the transmit hash table 138, the receive hash table 140 includes a plurality of hash table entries and a software hash function (not shown), and each hash table entry includes a table index and a table value. Again, the LBFO module 126 directs the hash engine 128 to select a receive NIC within the computing device 100 by communicating TCP/IP connection data to the hash engine 128, which communicates the TCP/IP connection data to the software hash function in the receive hash table 140. In response, the software hash function selects a table index within the receive hash table 140, based on the values of the TCP/IP connection data. From this selected table index, the receive hash table 140 identifies the corresponding table value, and the hash engine 128 communicates the identified table value back to the LBFO module 126. In one embodiment, the TCP/IP data that the LBFO module 126 communicates to the hash engine 128 includes the server IP address. In other embodiments, the LBFO module 126 may communicate any technically feasible TCP/IP data to the hash engine 128.

The computing device 100 may be a desktop computer, server, laptop computer, palm-sized computer, personal digital assistant, tablet computer, game console, cellular telephone, or any other type of similar device that processes information.

FIGS. 2A-2D illustrate a flowchart of method steps 200 for failing back network connections from an overloaded NIC to a recovered NIC, according to one embodiment of the invention. Although the method is described in reference to the computing device 100, persons skilled in the art will understand that any system configured to perform the method steps, in any order, is within the scope of the present invention.

As shown, the method for failing back network connections begins at step 202, where the LBFO module 126 monitors the status of each NIC for an indication that a failed or unreliable NIC has recovered (i.e., that the failed or unreliable NIC is now fully functional). In one embodiment, a NIC is deemed to have recovered when two conditions are present. First, based on the link indication for the failed or unreliable NIC, the LBFO module 126 determines that a link connection exists for the failed or unreliable NIC, suggesting that a network cable which may have been previously disconnected has now been reconnected. Second, the LBFO module 126 determines that keep-alive packets transmitted between the NICs in the computing device 100 are being received reliably by the failed or unreliable NIC. As described in the related U.S. patent application titled, "Technique for Identifying a Failed Network Interface Card within a Team of Network Interface Cards," filed on Dec. 15, 2005 and having Ser. No. 11/303,285, failed or functional NICs within a computing device can be identified based on how each NIC is transmitting and/or receiving keep-alive packets. This related patent application is hereby incorporated herein by reference. By monitoring these two conditions, the LBFO module 126 is able to determine whether a failed or unreliable NIC has recovered.

In step 204, the LBFO module 126 determines whether a failed or unreliable NIC being monitored in step 202 has recovered. If the failed or unreliable NIC has not recovered, then the method returns to step 202, where the LBFO module 126 continues to monitor the failed or unreliable NIC. If in step 204, however, the LBFO module 126 determines that the failed or unreliable NIC has recovered, then the method proceeds to step 206. For purposes of discussion only, it is assumed that the NIC 110 had previously failed or become unreliable and has now recovered, that one or more connection sets that were initially communicating through NIC 110 were transferred to NIC 116 when NIC 110 failed, and that NIC 116 is currently overloaded. As used herein, a "connection set" is a plurality of connections that were initially communicating through a common NIC. Importantly, transferring connection sets rather than individual connections to a failback NIC prevents connections for a given MAC address from being assigned to more than one NIC.

In step 206, the LBFO module 126 signals the TCP/IP stack 130 that the NIC 110 has recovered. In step 208, the LBFO module 126 signals the hash engine 128 that the NIC 110 has recovered. In step 209, the hash engine 128 configures the transmit hash table 138 and the receive hash table 140 to enable connections to be assigned again to the NIC 110 when the hash engine 128 makes decisions regarding how network connections should be distributed across the functional NICs within the computing device 100.

In step 210, the LBFO module 126 monitors the fully functional NICs 110, 111 and 116 to determine whether any of these NICs is overloaded. In one embodiment, a NIC is deemed to be overloaded when the utilization of that NIC, as a percentage of the transmit or receive capacity of the NIC, is above a certain threshold value. In another embodiment, a NIC is deemed to be overloaded when the error rate for the NIC rises above a certain threshold value. In yet another embodiment, a combination of utilization and error rate may be used to determine whether a NIC is overloaded. In step 212, the LBFO module 126 determines whether any of the NICs 110, 111 and 116 being monitored in step 210 is overloaded, based on the utilization of each NIC and/or the error rate of that NIC. If the LBFO module 126 finds that none of the monitored NICs is overloaded, then the method returns to step 210, where the LBFO module 126 continues monitoring the NICs 110, 111 and 116.

If in step 212, however, a NIC is found to be overloaded (e.g., NIC 116), then the method proceeds to steps 214-238, where a plurality of "connection sets" on the overloaded NIC 116 are "rehashed" to reduce the network traffic on the overloaded NIC 116. Here, rehashing a connection set includes determining the "initial NIC" for the connection set and transferring the connection set to the recovered NIC 110. As used herein, "initial NIC" refers to the NIC through which a connection was originally communicated. In step 214, the LBFO module 126 selects a connection set on the overloaded NIC 116 to rehash. In step 216, if necessary, the LBFO module 126 unoffloads the selected connection set from the HOE 118 to the TCP/IP stack 130. As described in the related U.S. patent application titled, "Intelligent Failover in a Load-Balanced Networking Environment," filed on May 18, 2007 and having Ser. No. 11/750,903, connections may be offloaded or unoffloaded to the hardware offload engines 112, 113 and 118 within the NICs 110, 111 and 116, respectively. This related patent application is hereby incorporated herein by reference.

In step 217, the LBFO module 126 identifies the recovered NIC (in this case, the recovered NIC 110) as the new NIC to which the selected connection set should be transferred. Importantly, once the LBFO module 126 identifies the recovered NIC 110 as the new NIC for the selected connection set, the LBFO module 126 configures itself to intercept packets being communicated from the operating system 122 to a remote computing device (not shown) and rewrites the source MAC address of the intercepted packets to correspond to the MAC address of the recovered NIC 110. Rewriting the source MAC address of the packets of a connection set ensures that the receive traffic for the connection set will be correctly distributed to recovered NIC 110 by the switch. In step 218, the LBFO module 126 determines which NIC within the computing device 100 was the initial NIC for the selected connection set. In one embodiment, the identity of the initial NIC for each connection set is stored in the TCP/IP stack 130, allowing the LBFO module 126 to query the TCP/IP stack 130 for the identity of the initial NIC for any connection set. In step 219, the TCP/IP stack 130 directs the recovered NIC 110 to send a learning packet to the network switch (again, not shown). The learning packet may be any technically feasible packet type that includes the MAC address of the initial NIC. As is well-known, sending such a packet from the recovered NIC 110 causes the switch to reconfigure itself to route subsequent packets destined for the MAC address of the initial NIC for the selected connection set (here, the recovered NIC 110) to the actual NIC 110 and not the overloaded NIC 116. Thus, all network traffic related to the selected connection set being transferred to the recovered NIC 110 is thereafter received by the recovered NIC 110.

In step 220, the LBFO module 126 determines whether the initial NIC for the selected connection set was the recovered NIC 110, based on the identity of the initial NIC determined in step 218. If the LBFO module 126 determines that the initial NIC for the selected connection set was the recovered NIC (in this case, NIC 110), then the method proceeds to step 222, where the software driver 124 removes the MAC address of the initial NIC for the selected connection set from the multicast list of the overloaded NIC 116. Removing this MAC address from the multicast list prevents the overloaded NIC 116 from receiving packets that are being transmitted to the MAC address of the initial NIC (here, NIC 110). In step 232, the LBFO module 126 optionally offloads the selected connection set to the HOE 112 within the recovered NIC 110 if the LBFO module 126 determines that the performance benefit from offloading warrants such action.

In step 234, the LBFO module 126 determines whether a sufficient number of connection sets on the overloaded NIC 116 have been rehashed such that the NIC 116 is no longer overloaded. If the LBFO module 126 determines that the NIC 116 is no longer overloaded, then the method terminates at step 238. If, however, the NIC 116 is still overloaded, then the method proceeds to step 236, where the LBFO module 126 selects another connection set on the overloaded NIC 116 to rehash before returning to step 216.

Returning now to step 220, if the LBFO module 126 determines that the initial NIC for the selected connection set was not the recovered NIC 110—meaning (i) that that the selected connection set was transferred to the overloaded NIC 116 from a functional NIC other than NIC 110 in a previous load-balancing operation, or (ii) that the overloaded NIC 116 was the initial NIC for the selected connection set—then the method proceeds to step 226. In step 226, the software driver 124 removes the MAC address of the initial NIC from the multicast list of the overloaded NIC 116, if the selected connection set was transferred to the overloaded NIC 116 from a functional NIC other than NIC 110 in a previous load-balancing operation.

In step 228, the software driver 124 adds the MAC address of the initial NIC for the selected connection set to the multicast list of the recovered NIC 110, which allows the NIC 110 to receive packets, associated with the selected connection set, that are being transmitted to the MAC address of the initial NIC. The method then proceeds to step 232, as set forth above.

One advantage of the disclosed method is that, by rehashing connection sets on an overloaded NIC, intelligent decisions can be made regarding whether to fail back a network connection set to a recovered NIC based on the traffic loads on the overloaded NIC and the recovered NIC. Such an approach to balancing network traffic across the functional NICs within a computing device may substantially improve overall performance relative to prior art techniques.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for failing back network connections to a network interface card (NIC) within a computing device, the method comprising:
   monitoring a failed or unreliable NIC within the computing device;
   determining that the failed or unreliable NIC has recovered;
   determining that a functional NIC within the computing device is overloaded;
   selecting a first connection set communicating through the overloaded NIC;
   querying a host software stack to determine that each connection in the first set of connections initially communicated through the recovered NIC prior to communicating through the overloaded NIC;
   transferring the first connection set to the recovered NIC;
   removing a MAC address associated with the recovered NIC from a multicast list associated with the overloaded NIC, wherein, once the MAC address associated with the recovered NIC is removed from the multicast list, the overloaded NIC no longer receives packets that are transmitted to the MAC address associated with the recovered NIC;
   intercepting a first packet transmitted by an operating system to a remote device via at least one connection in the first connection set;
   modifying a source media access control (MAC) address included in the intercepted packet that specifies a MAC address associated with the overloaded NIC to specify a MAC address associated with the recovered NIC; and
   offloading at least one connection in the first connection set to a hardware offload engine associated with the recovered NIC;
   wherein the step of transferring the first connection comprises the step of transmitting a learning packet to a network switch through the recovered NIC.

2. The method of claim 1, further comprising the step of communicating to a hash engine that the failed or unreliable NIC has recovered.

3. The method of claim 2, further comprising the step of updating a hash table to reflect that the failed or unreliable NIC has recovered.

4. The method of claim 1, further comprising the step of unoffloading at least one connection in the first connection set from a hardware offload engine associated with the overloaded NIC.

5. A non-transitory computer-readable medium storing instructions that when executed by a processor cause the processor to fail back network connections to a network interface card (NIC) within a computing device, by performing the steps of:
   monitoring a failed or unreliable NIC within the computing device;
   determining that the failed or unreliable NIC has recovered;
   determining that a functional NIC within the computing device is overloaded;
   selecting a first connection set communicating through the overloaded NIC;
   querying a host software stack to determine that each connection in the first set of connections initially communicated through the recovered NIC prior to communicating through the overloaded NIC;
   transferring the first connection set to the recovered NIC;
   removing a MAC address associated with the recovered NIC from a multicast list associated with the overloaded NIC, wherein, once the MAC address associated with the recovered NIC is removed from the multicast list, the overloaded NIC no longer receives packets that are transmitted to the MAC address associated with the recovered NIC;
   intercepting a first packet transmitted by an operating system to a remote device via at least one connection in the first connection set;
   modifying a source media access control (MAC) address included in the intercepted packet that specifies a MAC address associated with the overloaded NIC to specify a MAC address associated with the recovered NIC; and
   offloading at least one connection in the first connection set to a hardware offload engine associated with the recovered NIC;
   wherein the step of transferring the first connection comprises the step of transmitting a learning packet to a network switch through the recovered NIC.

6. The computer-readable medium of claim 5, further comprising the step of communicating to a hash engine that the failed or unreliable NIC has recovered.

7. The computer-readable medium of claim 6, further comprising the step of updating a hash table to reflect that the failed or unreliable NIC has recovered.

8. The computer-readable medium of claim 5, further comprising the step of unoffloading at least one connection in the first connection set from a hardware offload engine associated with the overloaded NIC.

9. A computing system configured to fail back a network connection to a network interface card (NIC), the system comprising:
   a processing unit;
   a plurality of NICs through which one or more network connections are communicated; and
   a memory coupled to the processing unit, wherein the memory stores a software driver that is configured to:
     monitor a failed or unreliable NIC within the computing device,
     determine that the failed or unreliable NIC has recovered,
     determine that a functional NIC within the computing device is overloaded, select a first connection set communicating through the overloaded NIC, query a host software stack to determine that each connection in the first set of connection initially communicated through the recovered NIC prior to communicating through the overloaded NIC, transfer the first connection set to the recovered NIC, remove a MAC address associated with the recovered NIC from a multicast list associated with the overloaded NIC, wherein, once the MAC address associated with the recovered NIC is removed from the multicast list, the overloaded NIC no longer receives packets that are transmitted to the MAC address associated with the recovered NIC, intercept a first packet transmitted by an operating system to a remote device via at least one connection in the first connection set, modify a source media access control (MAC) address included in the intercepted packet that specifies a MAC address associated with the overloaded NIC to specify a MAC address associated with the recovered NIC, and offload at least one connection in the first connection set to an offload engine associated with the recovered NIC;

wherein the step of transferring the first connection comprises the step of transmitting a learning packet to a network switch through the recovered NIC.

10. The computing system of claim 9, wherein the software driver is further configured to communicate to a hash engine that the failed or unreliable NIC has recovered.

11. The computing system of claim 10, wherein the software driver is further configured to update a hash table to reflect that the failed or unreliable NIC has recovered.

12. The computing system of claim 9, wherein the software driver is further configured to unoffload at least one connection in the first connection set from a hardware offload engine associated with the overloaded NIC.

* * * * *